Feb. 11, 1936. J. VAN VORST ET AL 2,030,555
VEHICLE FOR ROAD BUILDING AND REPAIRING
Filed Aug. 30, 1929 2 Sheets-Sheet 1
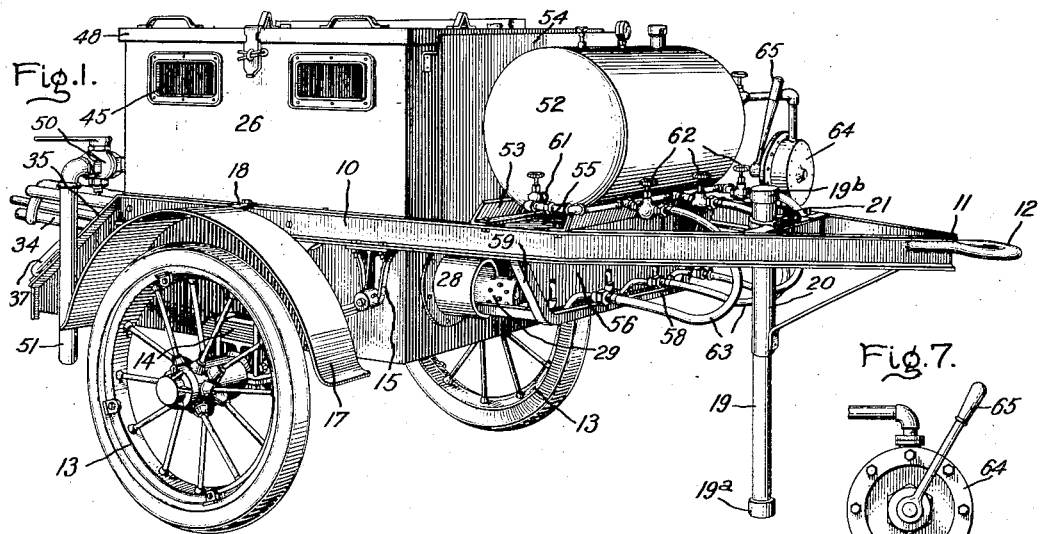
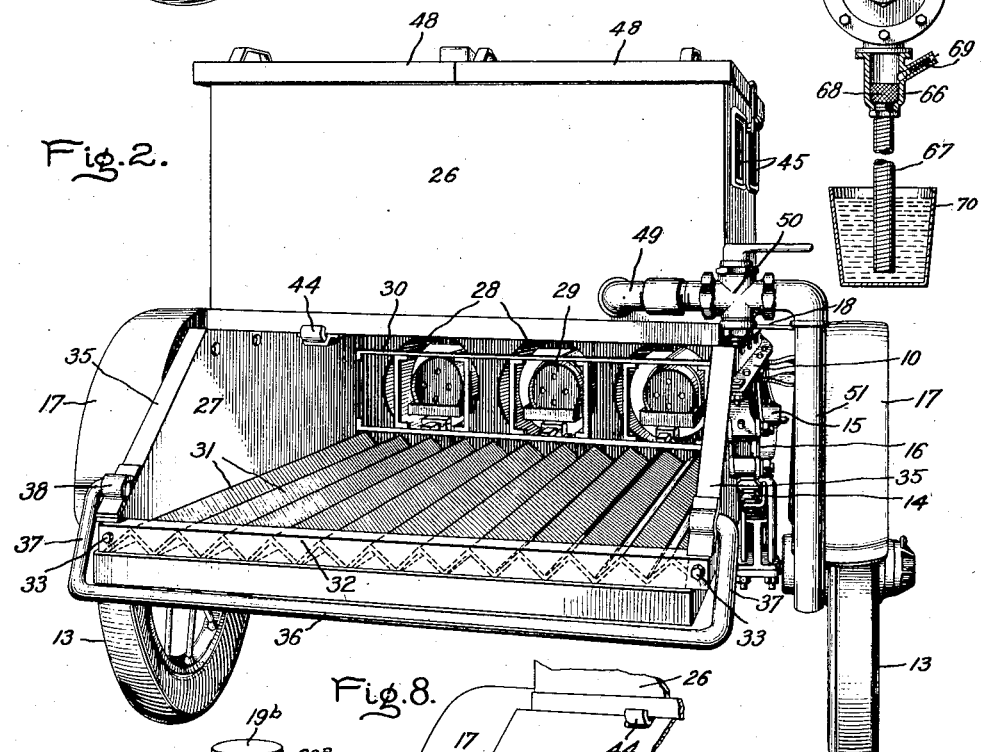
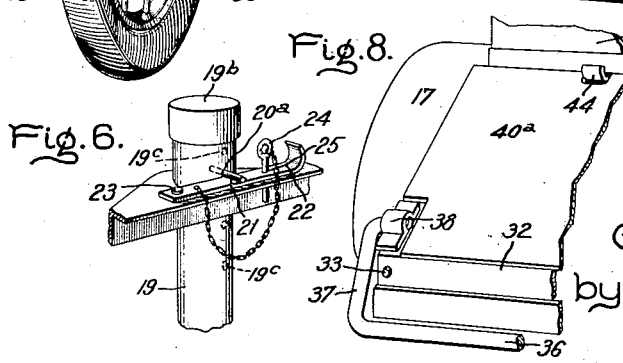
Inventors:
John Van Vorst,
George M. Baker,
by Robert McBruce
Their Attorney.

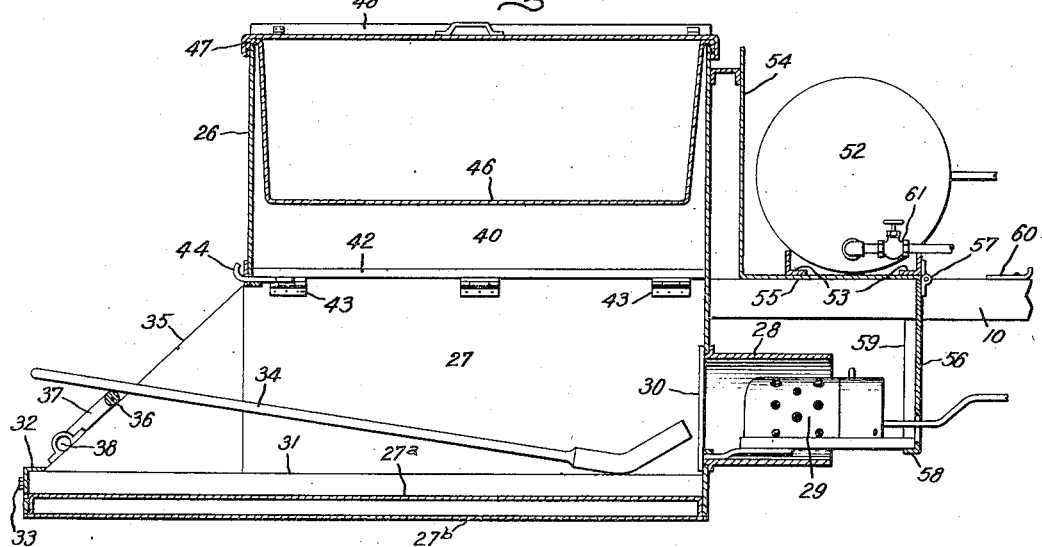

Patented Feb. 11, 1936

2,030,555

UNITED STATES PATENT OFFICE 2,030,555

VEHICLE FOR ROAD BUILDING AND REPAIRING

John Van Vorst, Schenectady, and George M. Baker, Scotia, N. Y., assignors, by mesne assignments, to Mohawk Asphalt Heater Company, Frankfort, N. Y.

Application August 30, 1929, Serial No. 389,426

11 Claims. (Cl. 126—343.5)

Our invention relates to road building and repairing equipment of the type including a combination tool heater and heating chamber for bitumen or other suitable material, and has for its object to produce a vehicle or device of this character which is of simple and compact construction, and having the parts thereof arranged so that the device can be transported from one place to another in operation, the operative relation of the parts of the device not being disturbed.

Further objects and advantages of our invention will become apparent as the following description proceeds, and the features of novelty which characterize our invention will be pointed out with particularity in the claims annexed to and forming a part of this specification.

In the drawings Fig. 1 is a side perspective view of a road building and repair vehicle embodying the features of our invention; Fig. 2 is an end perspective view of the structure shown in Fig. 1; Fig. 3 is a longitudinal section of the combustion chamber and material heating chamber showing the arrangement of the fuel tank and shields for protecting the same; Fig. 4 is an end view of the combustion chamber and material heating chamber partly broken away to more clearly illustrate the structure; Fig. 5 is a fragmentary perspective view of the wind deflector which we employ for the burners of the device; Fig. 6 is a perspective view of the latch used for a supporting leg of the vehicle; Fig. 7 is a view of the fuel tank filling pump, and Fig. 8 is a perspective view of the back of the vehicle showing a cover in place.

Referring to the drawings, the vehicle which we have illustrated as an example of one manner of carrying out our invention is a trailer including a V-shaped frame 10 having the arms thereof joined together, as indicated at 11, and having a suitable eye 12 welded thereto for securing the trailer to the vehicle by which it is drawn. The V-shaped frame is supported on wheels 13 by springs 14 which are attached to the arms of the frame. These springs are secured to the frame at one end thereof by brackets 15 and at the other end thereof by shackles 16, mud-guards 17 being arranged over the wheels and secured to the frame 10 at 18. The trailer is supported in approximately horizontal position when in use by a leg 19 having caps 19a and 19b on the ends thereof, and mounted in a tubular support 20. The cap 19a serves as a foot for the leg, and the cap 19b prevents the leg from dropping out of the tubular support. The leg 19 is adjustably secured in the tubular support 20, as shown in Fig. 6, by a latch including a pin 21 extending through a hole 20a therein which can be placed in any one of a series of holes 19c in the leg so as to support the frame 10 in the position desired. In order to facilitate moving the pin into and out of the openings 20a and 19c, it is attached to an arm 22 which is pivotally connected to the frame at 23 and is provided with a lock pin 24 which can be placed in an opening 25 in the arm and an opening in the frame when the arm is swung into position to hold the leg 19 in adjusted position.

The material heating chamber of our improved vehicle is generally indicated at 26 and is attached to the arms of the V-shaped frame 10 between the wheels 13. We prefer to arrange combustion chamber 27 below the material heating chamber. The combustion chamber is open at the rear end of the vehicle, as clearly shown in Figs. 2 and 3, and the other end thereof is provided with a plurality of openings in which wind collars 28 are attached for shielding the flame of burners 29, which are directed into the combustion chamber toward the open end thereof, the burners and wind collars being arranged below the arms of the frame 10. In order to prevent tools which are placed in the combustion chamber being thrust against the burners so as to displace them or damage them, we provide a grating or framework 30 welded to the side wall of the combustion chamber and arranged across the openings in the end thereof, as shown in Figs. 2 and 4.

In order to support tools which are to be heated in the combustion chamber 27 so that the products of combustion from the burners will flow around them and heat them uniformly and quickly, we arrange a plurality of angle-irons 31 in the bottom of the combustion chamber with the edges of the angle-irons forming the juncture between the sides thereof presented upwardly and the other edges thereof resting on the bottom so as to form a grate, as shown in Fig. 4. This angle-iron grate is secured in place by the framework 30 at one end and by an angle-iron 32 at the other end. We prefer to make this angle-iron grate in units of four angle-irons welded together, so that any one of the units can be readily replaced when desired. The angle-iron 32, which is bolted to the side walls of the combustion chamber at 33 also serves as a support for the handles of the tools to be heated. The angle-irons forming the grate in the bottom of the combustion chamber rest on the bottom wall 27a thereof which is separated from a bottom wall 27b so as to form an air space. This double bottom of the combustion chamber prevents any undue heating of the wall 27b which would heat the pavement below the vehicle to such an extent as to melt the bitumen or other surfacing material thereof and require refinishing.

It will be apparent that if the tools which are heated in the combustion chamber, such as indicated at 34, are permitted to rest on the bottom of the combustion chamber that in transporting the vehicle from one place to another the tools will be likely to slide toward the rear of the vehicle and out of the open end of the combustion chamber. In order to avoid this we form the side walls of the open end of the combustion chamber inclined downwardly, as indicated at 35, and pivotally support a bar 36 by arms 37 on the side walls at 38, which in the ordinary use of the combustion chamber for heating tools can be swung below the open end of the same, as shown in Figs. 2 and 4. When it is desired to move the vehicle from one place to another, the bar 36 is swung from its position below the open end of the combustion chamber until it rests on the inclined side walls 35 of the open end of the combustion chamber, as shown in Figs. 1 and 3. The tools 34 will then be in the position shown in Fig. 3 so that they cannot slide out of the open end of the combustion chamber.

The side walls of the combustion chamber 27 are extended, as indicated at 39, to form a material heating chamber 40 arranged transversely of the combustion chamber. These chambers are separated by a partition wall 41 having an opening 41a therein that is controlled by a damper 42 which is hinged to the side wall of the combustion chamber at 43 and which is provided with a latch 44. This damper regulates the flow of products of combustion from the burners to the material heating chamber, and they are discharged from this chamber through openings 45 formed in the upper portion of the side wall thereof. If it is desired to melt bitumen or other material in the melting chamber without heating tools the capacity of the melting chamber can be substantially increased by placing a cover 40a over the open end of the combustion chamber, as shown in Fig. 8, so that all of the products of combustion pass through the opening 41a to the bottom of the melting chamber and are discharged through the openings 45.

The material to be heated may be arranged in the material heating chamber in any convenient manner but we prefer to employ a construction substantially like that disclosed in our Patent No. 1,355,931 of October 19, 1920. In the present construction the material to be heated is adapted to be retained in a container 46 having the upper edge thereof turned over at 47 for supporting the same in the top of the material heating chamber and is closed by a suitable removable cover indicated at 48.

The hot or melted material is withdrawn from the container 46 through an outlet pipe 49 which is pivotally connected thereto. This outlet pipe is provided with a valve 50 and a down-turned portion 51. When it is desired to place the tool and material heating device in use the material usually congeals in the pipe 49 so that before the valve 50 can be opened and the obstruction in the pipe 49 due to the congealed bitumen or other material therein can be removed, it is necessary to heat the pipe and the valve. In order to accomplish this heating of the pipe and the valve, we pivotally connect the outlet to the material container and arrange the same so that it can be swung from its normal position with the pipe 51 at the side of the combustion chamber, as shown in Fig. 2, across the open end of the combustion chamber 27, as shown in Fig. 4. By this construction we render it unnecessary to employ auxiliary burners or heaters of any kind in placing our device in operation.

In order to make the construction of our combined tool heater and material heater as compact as possible, and so that the entire operative structure can be transported as a unit we support a fuel tank 52 for supplying fuel to the burners on angle-irons 53 above the burners 29 and in spaced relation to the end wall of the combustion and material heating chambers. We prevent the overheating of the fuel in the tank 52 by arranging a shield 54 between the material heating chamber and the fuel tank in spaced relation to the former extending below the fuel tank in spaced relation to the burners, as indicated at 55. This shield also has the advantage that it protects the burners from excessive drafts. The burners are also protected from drafts by a wind deflector 56 forming a continuation of the shield 55, which is hinged to one of the angle-irons 53 at 57 and engages a cross-member 58 which depends from the arms of the frame 10 and is secured thereto by upwardly extending portions 59. We make the burners readily accessible by providing a latch 60 on the frame 10 which is arranged to hold the wind deflector 56 in a substantially horizontal position. Fuel is supplied to the burners 29 from the fuel tank 52 through a main control valve 61 and a controlling valve 62 for each burner, so that any one burner can be removed without first shutting down other burners. The controlling valves 62 are connected to the burners by flexible conduits 63 so that the burners can readily be removed from the collars 28 for inspection and adjustment.

The fuel in the tank 52 is retained under an approximate pressure of 50 pounds per square inch, and a body of air is maintained above the oil to force the fuel to the burners. It has been the practice heretofore in refilling such tanks to remove a filler cap and pour the fuel into the tank through a funnel. This is objectionable because it is dangerous and wasteful of fuel, as the fuel is likely to be spilled on the burners and thus ignited, and it is difficult to maintain the filler cap air tight. Moreover, filling by a can or open vessel in this way often carries dirt into the tank which finds its way to the burners and clogs the openings or passages therein. In accordance with another aspect of our invention, therefore, we provide a fuel feeding arrangement which permits filling the tank and supplying air thereto for maintaining the required amount of air above the fuel in the tank. The particular construction illustrated, which is merely an example of one manner of carrying out this aspect of our invention, includes a pump 64, which can be operated by manually oscillating the handle 65 thereof. The discharge of the pump is connected to the fuel tank and its intake is connected through an air valve and strainer 66 to a flexible hose 67 extending near the surface of the road. The strainer is provided with a screen 68 and an air valve 69 communicating with the atmosphere, which is arranged above the screen and opens toward the strainer casing. The air valve is adjusted so that when fuel is pumped into the tank sufficient air is drawn into the pump at each stroke to maintain the required amount of air above the fuel level in the tank.

In the operation of this fuel tank filling arrangement the hose 67 is placed in a bucket 70, or other suitable container, and the pump is then actuated until the tank is filled. At each stroke of the pump fuel and a small amount of air are drawn into the same, the air entering the intake of the pump through the valve 69. In this way fuel is supplied to the tank without any danger of spilling, and without the necessity of lifting the fuel receptacle to the filling opening of the tank. Moreover the hose can be placed in the opening of a covered can which substantially prevents dirt getting into the fuel and being carried to the tank.

Modifications of our invention will occur to those skilled in the art so that we do not desire the same to be limited to the particular construction shown and described, and we intend in the appended claims to cover all modifications which do not depart from the spirit and scope of our invention.

What we claim as new and desire to secure by Letters Patent of the United States, is:—

1. A vehicle for road building and repairing including a V-shaped frame, a combustion chamber at the rear end of the vehicle and having burner openings at the other end thereof, a material heating chamber arranged above said combustion chamber, said chambers being secured to the arms of said frame, an oil tank supported on said frame at the front of said chambers and spaced therefrom, a plurality of burners below said tank directed into the openings in said combustion chamber, flexible connections between said fuel tank and said burners, a cross member depending from said frame for supporting said burners, a shield between said tank and said combustion chamber and burners, a movable wind deflector for said burners forming a continuation of said shield, and wheels attached to said frame.

2. A heater for road building and repairing including a combustion chamber open at one end and a superimposed material heating chamber, an oil burner directed into said combustion chamber toward the open end thereof, an oil tank arranged adjacent said chamber in spaced relation thereto and above said burner, a flexible connection between said fuel tank and said burner, a shield between said fuel tank and said chambers and burner, and a movable wind deflector for said burner forming a continuation of said shield.

3. A heater for road building and repairing including a combustion chamber open at one end and a superimposed material heating chamber, an oil burner directed into said combustion chamber toward the open end thereof, an oil tank arranged adjacent said chamber in spaced relation thereto and above said burner, a flexible connection between said fuel tank and said burner, a shield between said fuel tank, and said chambers and burner, and a hinged wind deflector for said burner forming a continuation of said shield.

4. A heater for road building and repairing including a tool heating combustion chamber open at one end for the reception of tools, a material heating chamber above said combustion chamber, said chambers being arranged to form a flue having an outlet opening for the passage of products of combustion from said combustion chamber, and means including a damper in said flue for varying the amount of products of combustion passing from said combustion chamber through said flue so as to control the heating of material in said material heating chamber.

5. A heater for road building and repairing including a tool heating combustion chamber open at one end for the reception of tools, a material heating chamber above said combustion chamber, said chambers being arranged to form a flue having an outlet opening for the passage of products of combustion from said combustion chamber, and means including a hinged damper carried by the wall of said combustion chamber for controlling the passage of products of combustion through said flue so as to control the heating of material in said material heating chamber.

6. A heater for road building and repairing including a tool heating combustion chamber open at one end for the reception of tools, and a superimposed material heating chamber communicating with said combustion chamber, means forming a flue having an outlet directing products of combustion from said combustion chamber for heating said material heating chamber, a burner directed into said combustion chamber, and a removable cover for the open end of said combustion chamber for causing substantially all of the products of combustion from said burner to pass to said material heating chamber.

7. A heater for road building and repairing including a combustion chamber open at one end and having downwardly inclined side walls about the open end thereof, a bar hinged to said chamber and arranged to be swung from a position below said open end across the same and into engagement with said inclined side walls for supporting tools placed in said chamber.

8. A heater for road building and repairing including a combustion chamber open at one end and a material heating chamber, said chambers being arranged one above the other, and a pivoted outlet from said material heating chamber arranged to be swung across the open end of said combustion chamber for melting material congealed in said outlet.

9. A heater for road building and repairing including a combustion chamber open at one end and a material heating chamber, said chambers being arranged one above the other, and a pivoted outlet from said material heating chamber having a valve and arranged to be swung across the open end of said combustion chamber for melting material congealed in said outlet.

10. A road repair vehicle having a body comprising a combustion chamber open at one end to provide for introduction and removal of tools to be heated, a hearth projecting outwardly from the open mouth of said combustion chamber and adapted to support the handles of the tools while being heated, a blow-torch to heat the interior of said combustion chamber, a tar kettle mounted above said combustion chamber, a partition interposed between said combustion chamber and the bottom of said tar kettle to form an offtake flue beneath said tar kettle and separated from said combustion chamber, a gate operable to cut off communication from said combustion chamber to said offtake flue.

11. A road repair vehicle having a body comprising a combustion chamber open at one end to provide for introduction and removal of tools to be heated, a blow-torch to heat the interior of said combustion chamber located at the opposite end of said combustion chamber, a tar kettle mounted above said combustion chamber, a flue leading from the closed end of said combustion chamber to heat the bottom and side walls of said tar kettle, a damper in said flue adapted to regulate the amount of heat applied from said combustion chamber to said tar kettle, a protecting shield pivotally attached to said vehicle body and shielding the exposed portion of said blow-torch and having a limited adjustment to afford access to said torch when required, and a fuel tank reservoir located above said torch and hood and at one end of said tar kettle.

JOHN VAN VORST.
GEORGE M. BAKER.